United States Patent
Neumann et al.

(10) Patent No.: US 11,789,988 B2
(45) Date of Patent: *Oct. 17, 2023

(54) OPTIMIZING DATABASE QUERY EXECUTION BY EXTENDING THE RELATIONAL ALGEBRA TO INCLUDE NON-STANDARD JOIN OPERATORS

(71) Applicant: Tableau Software, Inc., Seattle, WA (US)

(72) Inventors: Thomas Neumann, Munich (DE); Viktor Leis, Munich (DE); Alfons Kemper, Munich (DE); Tobias Muehlbauer, Munich (DE); Jan Finis, Munich (DE)

(73) Assignee: Tableau Software, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/371,023

(22) Filed: Jul. 8, 2021

(65) Prior Publication Data

US 2022/0043846 A1 Feb. 10, 2022

Related U.S. Application Data

(63) Continuation of application No. 15/890,277, filed on Feb. 6, 2018, now Pat. No. 11,068,520, which is a
(Continued)

(51) Int. Cl.
*G06F 16/00* (2019.01)
*G06F 16/33* (2019.01)
*G06F 16/23* (2019.01)

(52) U.S. Cl.
CPC .......... *G06F 16/3332* (2019.01); *G06F 16/23* (2019.01); *G06F 16/334* (2019.01)

(58) Field of Classification Search
None
See application file for complete search history.

(56) References Cited

U.S. PATENT DOCUMENTS

| 5,948,038 A | 9/1999 | Daly |
| 6,195,449 B1 | 2/2001 | Bogden |

(Continued)

OTHER PUBLICATIONS

Neumann, Office Action, U.S. Appl. No. 15/700,023, dated Sep. 25, 2020, 21 pgs.

(Continued)

*Primary Examiner* — Debbie M Le
(74) *Attorney, Agent, or Firm* — Morgan, Lewis & Bockius LLP

(57) ABSTRACT

A method is executed at a computer system to retrieve data from a database. Upon receiving a database query, a database engine of the computer system parses the query to form an operator tree including a plurality of join operators. For one of the plurality of clauses, the database engine adds to the operator tree a respective node that specifies a mark join operator, a single join operator, an inner join operator, or an outer join operator. Specifically, the database engine adds the mark join operator when the clause includes one of a predetermined set of predicate subqueries, and adds the single join operator when the clause includes a scalar subquery. The database engine performs one or more optimization passes on the operator tree to form an optimized execution plan, and executes the optimized execution plan to retrieve a result set from the database.

20 Claims, 15 Drawing Sheets

Related U.S. Application Data continuation of application No. 15/700,023, filed on Sep. 8, 2017, now Pat. No. 11,055,331.

(60) Provisional application No. 62/532,959, filed on Jul. 14, 2017, provisional application No. 62/418,246, filed on Nov. 6, 2016.

(56) References Cited

U.S. PATENT DOCUMENTS

| | | | |
|---|---|---|---|
| 6,411,951 | B1 | 6/2002 | Galindo-Legaria et al. |
| 6,865,567 | B1 | 3/2005 | Oommen et al. |
| 7,478,080 | B2 | 1/2009 | Pirahesh et al. |
| 7,519,990 | B1 | 4/2009 | Xie |
| 7,617,179 | B2 | 11/2009 | Nica |
| 7,634,459 | B1 | 12/2009 | Eshet et al. |
| 7,882,100 | B2 | 2/2011 | Andrei |
| 8,465,346 | B1 | 6/2013 | Cattaneo |
| 8,645,346 | B2 * | 2/2014 | Dumitru ............ G06F 16/2471 707/769 |
| 8,782,619 | B2 | 7/2014 | Wu et al. |
| 9,195,712 | B2 | 11/2015 | Freedman et al. |
| 9,202,297 | B1 | 12/2015 | Winters |
| 9,413,807 | B1 | 8/2016 | Sherman |
| 9,633,076 | B1 | 4/2017 | Morton |
| 9,846,721 | B2 | 12/2017 | Weyerhauser |
| 10,089,281 | B1 | 10/2018 | Neumann et al. |
| 10,089,282 | B1 | 10/2018 | Neumann et al. |
| 10,325,010 | B1 | 6/2019 | Neumann et al. |
| 10,353,922 | B1 | 7/2019 | Stolte |
| 10,540,425 | B2 | 1/2020 | Neumann et al. |
| 10,789,416 | B2 | 9/2020 | Neumann et al. |
| 11,341,132 | B2 * | 5/2022 | Ma .................... G06F 16/24542 |
| 2003/0158842 | A1 | 8/2003 | Levy et al. |
| 2004/0205078 | A1 | 10/2004 | Galindo-Legaria et al. |
| 2005/0011391 | A1 | 1/2005 | Jennings |
| 2005/0026118 | A1 | 2/2005 | Chen |
| 2005/0027547 | A1 | 2/2005 | Chen |
| 2008/0209354 | A1 | 8/2008 | Stanek |
| 2009/0106778 | A1 | 4/2009 | Pomeroy |
| 2011/0055199 | A1 * | 3/2011 | Siddiqui ............ G06F 16/2456 707/E17.017 |
| 2011/0055585 | A1 | 3/2011 | Lee |
| 2011/0316884 | A1 | 12/2011 | Giambalvo et al. |
| 2012/0323956 | A1 | 12/2012 | Dumitru et al. |
| 2015/0362325 | A1 | 12/2015 | Shin |

OTHER PUBLICATIONS

Neumann, Notice of Allowance, U.S. Appl. No. 15/700,023, dated Mar. 15, 2021, 9 pgs.

Neumann, Office Action, U.S. Appl. No. 15/719,479, dated Feb. 20, 2018, 8 pgs.

Neumann, Notice of Allowance, U.S. Appl. No. 15/719,479, dated Jul. 24, 2010, 10 pgs.

Neumann, Pre-Interview First Office Action, U.S. Appl. No. 15/885,646, dated May 3, 2018, 5 pgs.

Neumann, Notice of Allowance, U.S. Appl. No. 15/885,646, dated Jul. 18, 2018, 10 pgs.

Neumann, Office Action, U.S. Appl. No. 16/134,919, dated Jan. 24, 2019, 12 pgs.

Neumann, Notice of Allowance, U.S. Appl. No. 16/445,139, dated Sep. 17, 2019, 9 pgs.

Neumann, Office Action, U.S. Appl. No. 16/726,737, dated Feb. 18, 2020, 9 pgs.

Neumann, Notice of Allowance, U.S. Appl. No. 16/726,737, dated May 29, 2020, 9 pgs.

Neumann, Notice of Allowance, U.S. Appl. No. 15/890,277, dated Mar. 17, 2021, 11 pgs.

Neumann, Office Action, U.S. Appl. No. 17/037,505, dated Jun. 9, 2021, 12 pgs.

Neumann, Notice of Allowance, U.S. Appl. No. 17/037,505, dated Sep. 14, 2021, 9 pgs.

Neumann, Office Action, U.S. Appl. No. 17/368,767, dated Oct. 6, 2022, 15 pgs.

Neumann, Notice of Allowance, U.S. Appl. No. 17/368,767, dated Mar. 1, 2023, 9 pgs.

The Information Lab, Tips for using the Tableau Tooltip Tool, Aug. 20, 2015, YouTube, https://www.youtube.com/watch?v=D3WaD7gNVZk, 1 pg.

* cited by examiner

300 →

Professors

| Field Name | Data Type | Description |
|---|---|---|
| Name | Varchar(30) | The professor's name |
| PersID | Integer | Unique identifier |
| Sabbatical | Boolean | Is the professor on sabbatical? |

Courses

| Field Name | Data Type | Description |
|---|---|---|
| Title | Varchar(100) | Course Title |
| ECTS | N(6,2) | Credits for the course |
| Lecturer | Integer | PersID of the professor |

Assistants

| Field Name | Data Type | Description |
|---|---|---|
| Name | Varchar(30) | Name of the assistant |
| Boss | Integer | PersID of a professor |
| JobTitle | Varchar(50) | Job title |

Figure 3C

Equality Hash Join ($R \bowtie_{a=b} S$)

```
H = empty hash table
for each r in R
    store r into H[r.a]
for each s in S
    for each r in H[s.b]
        if r.a = s.b
            emit r,s
```

Figure 6A

Equality Hash Join with Mixed Types ($R \bowtie_{a=b} S$)

```
H = empty hash table
for each r in R
    a' = r.a cast to the type of S.b
    a'' = a' cast to the type of R.a
    if r.a = a''
        store r into H[a']
for each s in S
    for each r in H[s.b]
        if r.a = s.b
            emit r,s
```

Figure 6B

```
Full Outer Hash Join (R ⋈_{a=b} S)
H = empty hash table
for each r in R
    a' = r.a cast to compare type
    if cast was exact
        store r into H[a']
    else
        store r into H["extra"]
for each s in S
    sm = 0
    b' = s.b cast to compare type
    if cast was exact
        for each r in H[b']
            if r.a = s.b
                mark r as joined
                sm = 1
                emit r,s
    if sm = 0
        emit null,s
for each r in H
    if r is not marked
        emit r,null
```

Left Semi Hash Join ($R \ltimes_{a=b} S$)

```
H = empty hash table
for each r in R
    a' = r.a cast to compare type
    if cast was exact
        store r into H[a']
for each s in S
    b' = s.b cast to compare type
    if cast was exact
        for each r in H[b']
            if r.a = s.b and r is not marked
                mark r as joined
                emit r
```

Figure 6E

Left Single Hash Join ($R \bowtie^1_{a=b} S$)

```
H = empty hash table
for each r in R
    a' = r.a cast to compare type
    if cast was exact
        store r into H[a'] else
        store r into H["extra"]
for each s in S
    b' = s.b cast to compare type
    if cast was exact
        for each r in H[b']
            if r.a = s.b
                if r was marked as joined
                    throw an exception
                mark r as joined
                emit r,s
for each r in H
    if r is not marked
        emit r,null
```

Figure 6F

Left Mark Hash Join ($R \bowtie_a^M S$)

```
H = empty hash table
for each r in R
    if r.a is NULL
        mark r as NULL
        store r into H["null"]
    else
        mark r as FALSE
        a' = r.a cast to compare type
        if cast was exact
            store r into H[a'] else
            store r into H["extra"]
hadNull = false
for each s in S
    if s.b is NULL
        hadNull = true
    else
        b' = s.b cast to compare type
        if cast was exact
            for each r in H[b']
                if r.a = s.b
                    mark r as TRUE
if |S| = 0
    mark all entries in H["null"] as FALSE
for each r in H
    if r is marked FALSE and hadNull
        mark r as NULL
    emit r, marker of r
```

Figure 6G

```
B = empty memory buffer
for each r in R
    if B is full
        call joinBuffer(B)
    store r into B
if B is not empty
    call joinBuffer(B)
for each s in S
    if S is not marked
        emit null,s function joinBuffer(B):
for each s in S
    for each r in B
        if p(r,s)
            mark r as joined
            mark s as joined
            emit r,s
for each r in B
    if r is not marked
        emit r,null
clear B
```

700

| | TPC-H | | TPC-DS | |
|---|---|---|---|---|
| | before opt. | after opt. | before opt. | after opt. |
| inner ⋈ | yes | yes | yes | yes |
| left outer ⋈ | yes | no | yes | yes |
| right outer ⋈ | no | no | no | yes |
| full outer ⋈ | no | no | yes | yes |
| single ⋈ | yes | no | yes | yes |
| left mark ⋈ | - | yes | - | yes |
| right mark ⋈ | - | yes | - | yes |
| left semi ⋈ | - | yes | - | yes |
| right semi ⋈ | - | yes | - | yes |
| left anti semi ▷ | - | yes | - | no |
| right anti semi ◁ | - | yes | - | yes |
| group join | - | - | - | - |

Figure 7

OPTIMIZING DATABASE QUERY EXECUTION BY EXTENDING THE RELATIONAL ALGEBRA TO INCLUDE NON-STANDARD JOIN OPERATORS

RELATED APPLICATIONS

This application is a continuation of U.S. patent application Ser. No. 15/890,277, filed on Feb. 6, 2018, entitled "Optimizing Database Query Execution by Extending the Relational Algebra to Include Non-Standard Join Operators," which a continuation of and claims priority to U.S. patent application Ser. No. 15/700,023, filed on Sep. 8, 2017, entitled "Adaptive Interpretation and Compilation of Database Queries," now U.S. Pat. No. 11,055,331, which claims priority to U.S. Provisional Application Ser. No. 62/532,959, filed on Jul. 14, 2017, entitled "Generating Adaptively Optimized Code for Database Queries," and also claims priority to U.S. Provisional Application Ser. No. 62/418,246, filed on Nov. 6, 2016, entitled "High Performance Relational Database System," each of which is incorporated by reference herein in its entirety.

TECHNICAL FIELD

The disclosed implementations relate generally to database systems, and more specifically to system features that improve query execution performance.

BACKGROUND

Data is commonly stored in a relational database and accessed by queries using a prescribed syntax (e.g., Structured Query Language (SQL)). SQL database query engines are normally designed to translate a database query into a relational algebra. In this relational algebra, joins are among the important relational operators and come in a number of variants, including inner joins; left, right, and full outer joins; semi joins; and anti-semi joins. These join variants are sufficient to express most database queries. However, subqueries can occur almost everywhere in a database query, and how a subquery is translated can have a significant impact on execution performance. A conventional approach is to model a database query containing a subquery as mutual recursion (e.g., expressions and queries can refer to and evaluate each other). This mutual recursion approach is simple but non-relational, making many important optimizations nearly impossible. In effect, the mutual recursion approach predetermines the execution plan of common query patterns to nested-loop-style execution with $O(n^2)$ runtime.

SUMMARY

Accordingly, some disclosed implementations are directed to translating, optimizing, and executing database queries using two additional join types (in addition to inner joins, outer joins, and semi joins). The two additional join types are "single joins" and a "mark joins." In some implementations, the single joins and mark joins are introduced in an early stage of query translation and optimization in order to translate specific subquery constructs into an extended relational algebra. In some instances, a single join is added to the operator tree corresponding to the database query when a clause of the database query includes a scalar subquery. In some instances, a mark join operator is added to the operator tree when a clause of the database query includes one of a predetermined set of predicate subqueries. As a result of single joins and mark joins, mutual recursion of expressions and subqueries is broken up so that expressions do not refer to subqueries. Instead, subqueries are translated into re-orderable joins. This is an algebra-based and orthogonal approach that enables additional options for join reordering, supports an associated unnesting technique, and enables a join optimization pipeline in a hybrid OLTP/OLAP high performance database management system.

In accordance with some implementations, a method for retrieving data from a database is performed by a database engine. The database engine executes at a computer system (e.g., one or more computers or CPUs). The computer system has one or more processors and memory storing one or more programs configured for execution by the one or more processors. The database engine receives a database query from a client. The database query including a plurality of clauses. The database engine parses each of the clauses in the database query to form an operator tree including a plurality of join operators.

When a clause includes one of a predetermined set of predicate subqueries, the database engine adds to the operator tree a node that specifies a mark join operator between a respective left data set and a respective right data set. The mark join operator is configured to create a mark column in a respective intermediate result set for the respective node. The mark column specifies, for each tuple of the respective intermediate result set, whether or not the respective left data set has a join partner from the right data set. In some implementations, the predetermined set of predicate subqueries includes an EXISTS subquery, a NOT EXISTS subquery, a UNIQUE subquery, and a quantified comparison predicate. In some implementations, the mark column created for a mark join operator has a Boolean data type.

When a clause includes a scalar subquery, the database engine adds to the operator tree a node that specifies a single join operator between a respective left data set and a respective right data set. The single join operator is configured to raise an error when there is a row in the respective left data set with two or more join partners in the respective right data set. Otherwise, the single join operator is configured to operate as a left outer join.

When a clause does not include a scalar subquery, and does not include any of the predetermined set of predicate subqueries, the database engine adds an inner join operator, an outer join operator, or a semi join operator to the operator tree for each join condition in the clause.

The database engine performs one or more optimization passes on the operator tree to form an optimized execution plan, which includes unnesting one or more mark joins or single joins in the operator tree, and executes the optimized execution plan to retrieve a result set from the database.

In some implementations, each of the plurality of clauses has a clause type selected from the group consisting of: from clause, where clause, group by clause, having clause, select clause, and order by clause. In some implementations, a database query may have at most one clause of each clause type (at the outermost nesting level).

In some implementations, forming the operator tree includes translating the plurality of clauses in an order according to clause type, in the order: 1) from clause, 2) where clause, 3) group by clause, 4) having clause, 5) select clause, and 6) order by clause. In some implementations, forming the operator tree includes incrementally adding operators at a top node of an interim operator tree as the clauses are processed in order.

In some implementations, performing the one or more optimization passes includes identifying in the operator tree a first single join operator that joins a first column of a first left data set to a second column of a first right data set, and in accordance with a determination that the second column is a primary key for the first right data set, replacing the first single join operator with a corresponding left outer join operator between the first left data set and the second left data set.

In some instances, performing one or more optimization passes on the operator tree includes changing the order of the plurality of join operators in the operator tree. In some instances, the plurality of join operators includes a first mark join operator and a first inner join operator, and changing the order of the plurality of join operators in the operator tree includes performing the first mark join operator prior to the first inner join operator. In some implementations, the order of the plurality of join operators is determined according to a cost-based join enumeration method.

In some implementations, performing the one or more optimization passes on the operator tree includes, for each of the plurality of join operators, selecting a left variant or a right variant to implement the respective join operator according to respective sizes of the left and right data sets for the respective join operator (e.g., building a join hash table for the smaller data set).

In some implementations, performing the one or more optimization passes on the operator tree includes translating one or more mark join operators into one or more semi join operators.

In some implementations, performing the one or more optimization passes on the operator tree includes translating one or more outer join operators to one or more inner join operators.

In some implementations, a computer system includes one or more processors, and memory storing one or more programs that are configured for execution by the one or more processors. The one or more programs include instructions for performing any of the methods described herein.

In some implementations, a non-transitory computer readable storage medium stores one or more programs configured for execution by a computer system having one or more processors, and memory. The one or more programs include instructions for performing any of the methods described herein.

Thus, methods and systems are disclosed for translating, optimizing, and executing database queries using single joins and/or mark joins in addition to existing and commonly-known joins (e.g., inner joins, outer joins, and semi joins). For example, when a clause of a database query includes one of a predetermined set of predicate subqueries (e.g., EXISTS, NOT EXISTS, or UNIQUE), a node that specifies a mark join operator is added to the operator tree between a respective left data set and a respective right data set to create a mark column in an intermediate result set. The mark column specifies, for each tuple of the respective intermediate result set, whether or not the respective left data set has a join partner from the right data set. When a clause of a database query includes a scalar subquery, a node that specifies a single join is added to the operator tree operator between the respective left data set and the respective right data set. The single join operator is configured to raise an error when there is a row in the respective left data set with two or more join partners in the respective right data set. The single joins and mark joins are constructs in the extended relational algebra, which enable additional join-reordering options, support associated unnesting techniques, and facilitate the join optimization pipeline.

It is to be understood that both the foregoing general description and the following detailed description are exemplary and explanatory and are intended to provide further explanation of the invention as claimed.

BRIEF DESCRIPTION OF THE DRAWINGS

For a better understanding of the aforementioned systems and methods that provide efficient database query processing, reference should be made to the Description of Implementations below, in conjunction with the following drawings in which like reference numerals refer to corresponding parts throughout the figures.

FIGS. 3A-3C provide a skeletal database schema in accordance with some implementations.

FIG. 6A provides pseudocode for an equality hash join in accordance with some implementations. FIG. 6B provides pseudocode for an equality hash join having mixed data types in accordance with some implementations.

FIGS. 6E, 6F, 6G, and 6H provide pseudocode for processes to implement a left semi hash join, a left single hash join, a left mark hash join, and full outer non-equality blockwise nested loop join, in accordance with some implementations.

FIG. 7 is a table showing join types for two benchmark queries before optimization and after optimization, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
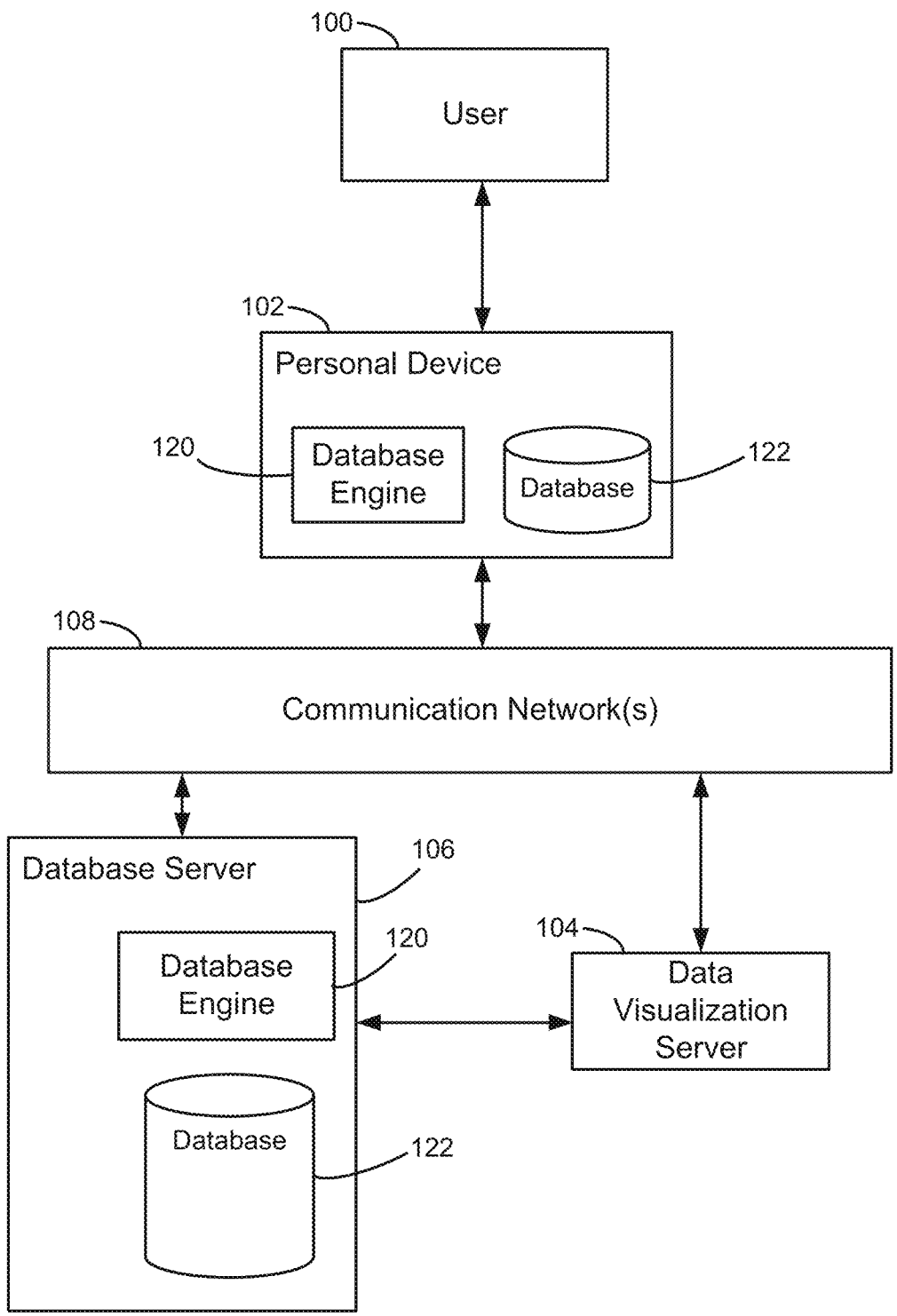
FIG. 1 illustrates a database system that retrieves data from a database in response to a database query in accordance with some implementations.

FIG. 1 illustrates using a database system to retrieve data from a database 122 in response to a database query in accordance with some implementations. A user 100 interacts with a personal device 102, such as a desktop computer, a laptop computer, a tablet computer, a mobile smartphone, or a mobile computer system. A personal device 102 is an example of a computer system 200. The term "computer system" also includes server computers, which may be significantly more powerful than a personal device used by a single user, and are generally accessed by a user indirectly via a personal device. An example computer system 200 is described below with respect to FIG. 2, including various software programs or modules that execute on the device 200. In some implementations, the personal device 102 includes one or more desktop data sources 224 (e.g., CSV files or spreadsheet files). In some implementations, the personal device 102 includes a database engine 120, which provides access to one or more relational databases 122 (e.g., SQL databases). Data stored in the relational databases 122 of the personal device 102 is retrieved in accordance with database queries received by the database engine 120. In some implementations, the personal device 102 includes a data visualization application 222, which the user 100 uses to create data visualizations from the desktop data sources 224 and/or the relational databases 122. For example, the data visualization application 222 of the personal device 102 generates a database query for a data visualization, and sends the database query to the database engine 120. The database engine 120 then retrieves data stored in the database 122 of the personal device 102 in response to the database query. Upon receiving the retrieved data from the database engine 120, the data visualization application 222 visualizes the retrieved data locally, thereby enabling the user 100 to visualize the data that is stored locally on the personal device 102.

In some implementations, the personal device 102 connects to one or more external database servers 106 and/or a data visualization server 104. Each of the one or more database servers 106 includes a database engine 120 configured to access one or more databases 122 that are stored at the respective database server 106. In some implementations, the data visualization server 104 includes a database engine 120 and one or more databases 122, and the database engine 120 is configured to access one or more databases 122 of the data visualization server 104.

In some implementations, data visualization functionality is implemented only by the data visualization application 222 of the personal device 102 locally. In some implementations, the data visualization functionality is provided collectively by the local data visualization application 222 and the remote data visualization server 104, particularly when corresponding data retrieval or visualization involves resource intensive operations that are preferably implemented at a specialized server. In this situation, the user 100 may build a data visualization using the local application 222 of the personal device 102. In some implementations, one or more requests are sent to the data visualization server 104 to generate data visualizations.

In some implementations, the personal device 102 connects to the external database servers 106 and/or the data visualization server 104 over one or more communications networks 108. The communication networks 108 can include one or more network topologies, including the Internet, intranets, local area networks (LANs), cellular networks, Ethernet, Storage Area Networks (SANs), telephone networks, Bluetooth personal area networks (PAN), and the like. In some implementations, the data visualization server 104 provides a data visualization web application that runs within a web browser 220 on the personal device 102.

In accordance with some implementations, upon receiving a database query that includes a plurality of clauses, the database engine 120 parses the database query to form an operator tree including a plurality of join operators, performs one or more optimization passes on the operator tree to form an optimized execution plan, and executes the optimized execution plan to retrieve a result set from the database. In some implementations, the plurality of join operators includes one or more of: inner joins, outer joins, mark joins, and single joins. In some implementations, the plurality of join operators also includes one or more of: semi joins, anti-semi joins, and dependent join variants of inner joins, semi joins, anti-semi joins, left outer joins, and full outer joins.

During the course of parsing the database query to form the operator tree, the database engine 120 determines, for each of the plurality of clauses, whether the respective clause includes a scalar subquery and/or whether the respective clause includes any of a predetermined set of predicate subqueries, including EXISTS subqueries, NOT EXISTS subqueries, UNIQUE subqueries, and quantified comparison predicates. When the respective clause includes one of the predetermined set of predicate subqueries, the operator tree incorporates a respective node that specifies a mark join operator between a respective left data set and a respective right data set. In some implementations, the database engine 120 determines, for each of the plurality of clauses, whether the respective clause includes a scalar subquery. When the respective clause includes a scalar subquery, the operator tree incorporates a respective node that specifies a single join operator between a respective left data set and a respective right data set. When the respective clause does not include a scalar subquery and does not include any of the predetermined set of predicate subqueries, the operator tree incorporates a standard join operator (e.g., an inner join or an outer join) to the operator tree for each join condition in the respective clause.

An inner join is a cross product of a left data set $T_1$ and a right data set $T_2$ followed by a selection:

$$T_1 \bowtie_p T_2 := \sigma(T_1 \times T_2) \qquad (1)$$

The selection $\sigma$ identifies the tuples in the cross product that satisfy the predicate p. The inner join computes a combination of matching entries from the left data set $T_1$ and the right data set $T_2$ according to the predicate p (e.g., comparing equality of a field in $T_1$ with a field in $T_2$).

In some instances, a database query includes a correlated subquery, and the subquery (as written) is evaluated for every tuple of a corresponding outer query. Some implementations translate a correlated subquery into a dependent join, which is characterized as:

$$T_1 \bowtie_p T_2 := \{t_1 \circ t_2 | t_1 \in T_1 \wedge t_2 \in T_2(t_1) \wedge p(t_1 \circ t_2)\}. \qquad (2)$$

Where $p(t_1 \circ t_2)$ determines whether the combination satisfies the predicate. The right-hand side is evaluated for every tuple of the left-hand side. In some instances, the attributes produced by an expression T are denoted by A(T), and free variables occurring in an expression T are denoted by F(T). In some implementations, to evaluate a dependent join, $F(T_2) \subseteq A(T_1)$ must hold (i.e., the attributes required by $T_2$ must be produced by $T_1$). In some implementations, a dependent join is associated with one or more transformation rules. In some implementations, a dependent join and the corresponding transformation rules are applied while unnesting, thereby optimizing the database query.

Semi joins, anti-semi joins, left outer joins, and the full outer join are represented by the following formulas:

| Join Type | Formula | Eq. |
|---|---|---|
| semi | $T_1 \ltimes_p T_2 := \{t_1 | t_1 \in T_1 \wedge \exists t_2 \in T_2 : p(t_1 \circ t_2)\}$ | (3) |
| anti-semi | $T_1 \triangleright_p T_2 := \{t_1 | t_1 \in T_1 \wedge \not\exists t_2 \in T_2 : p(t_1 \circ t_2)\}$ | (4) |
| left outer | $T_1 ⟕_p T_2 :=$ $(T_1 \bowtie_p T_2) \cup \{t_1 \circ_{\alpha \in A(T_2)} (a : null) | t_1 \in (T_1 \triangleright_p T_2)\}$ | (5) |
| full outer | $T_1 ⟗_p T_2 :=$ $(T_1 \bowtie_p T_2) \cup \{t_2 \circ_{\alpha \in A(T_1)} (a : null) | t_2 \in (T_2 \triangleright_p T_1)\}$ | (6) |

Each of the above join types has a corresponding dependent join variant that is analogous to the dependent join illustrated above in equations (1) and (2) for an inner join.

In addition to the join operators, the group by operator is represented as follows:

$$\Gamma_{A:a;f}(e) := \{x \circ (a:f(y)) | x \in \Pi_A(e) \wedge y = \{z | z \in e \wedge \forall a \in A : x.a = z.a\}\} \quad (7)$$

which groups an input e (e.g., a base relation or a relation computed from another algebra expression) by A, and evaluates one (or more comma separated) aggregation function(s) to compute aggregated attributes. In some situations, A is empty, so a single aggregation tuple is produced as a result of the group by operator.

A single join operator behaves essentially like an outer join operator, except that a single join operator will raise an error when there is a row in the left data set with two or more join partners in the right data set. A single join operator is particularly useful for translating a subquery that is intended to compute a scalar value (i.e., the subquery is expected to produce exactly one column and at most one row.) Specifically, when a subquery produces a single result, the single result is used as a scalar value, and when the subquery produces no result, the scalar value is set as NULL. However, when the subquery produces more than one result, the database engine 120 reports a runtime error. A single join operator is used, to express this in the extended relational algebra. The formula for a single join operator can be expressed as:

$$T_1 \bowtie^1_p T_2 := \begin{cases} \text{runtime error}, & \text{if } \exists t_1 \in T_1 : (|\{t_1\} \bowtie_p T_2| > 1) \\ T_1 ⟕_p T_2, & \text{otherwise} \end{cases} \quad (8)$$

Using single join operators improves both performance of the database engine 120 and accuracy of the result set returned in response to a database query. On the performance side, a hash-based process for implementing the single join has a runtime of O(n), which is much better than the O(n²) runtime associated with a conventional mutual recursion approach. More importantly, unlike other join implementations, the single join operator reports an error if more than one join partner is found.

A mark join operator creates a mark column in the intermediate result set created for the join. The mark column specifies, for each tuple of the respective intermediate result set, whether or not the respective left data set has a join partner from the right data set. The mark join creates a new attribute column (e.g., a Boolean data field) to specify whether or not each tuple has at least one join partner:

$$T_1 \bowtie^{M:m}_p T_2 := \{t_1 \circ (m : (\exists t_2 \in T_2 : p(t_1 \circ t_2))) | t_1 \in T_1\} \quad (9)$$

In some implementations, a mark join is evaluated in O(n) time when using hashing. Importantly, the query optimizer can optimize expressions in the relational algebra that include mark joins. In some implementations, the mark join operator is used to translate predicate subqueries that arise from exists, not exists, unique, and quantified comparisons, and may be further optimized to offer an efficient evaluation strategy.

Figure 2:
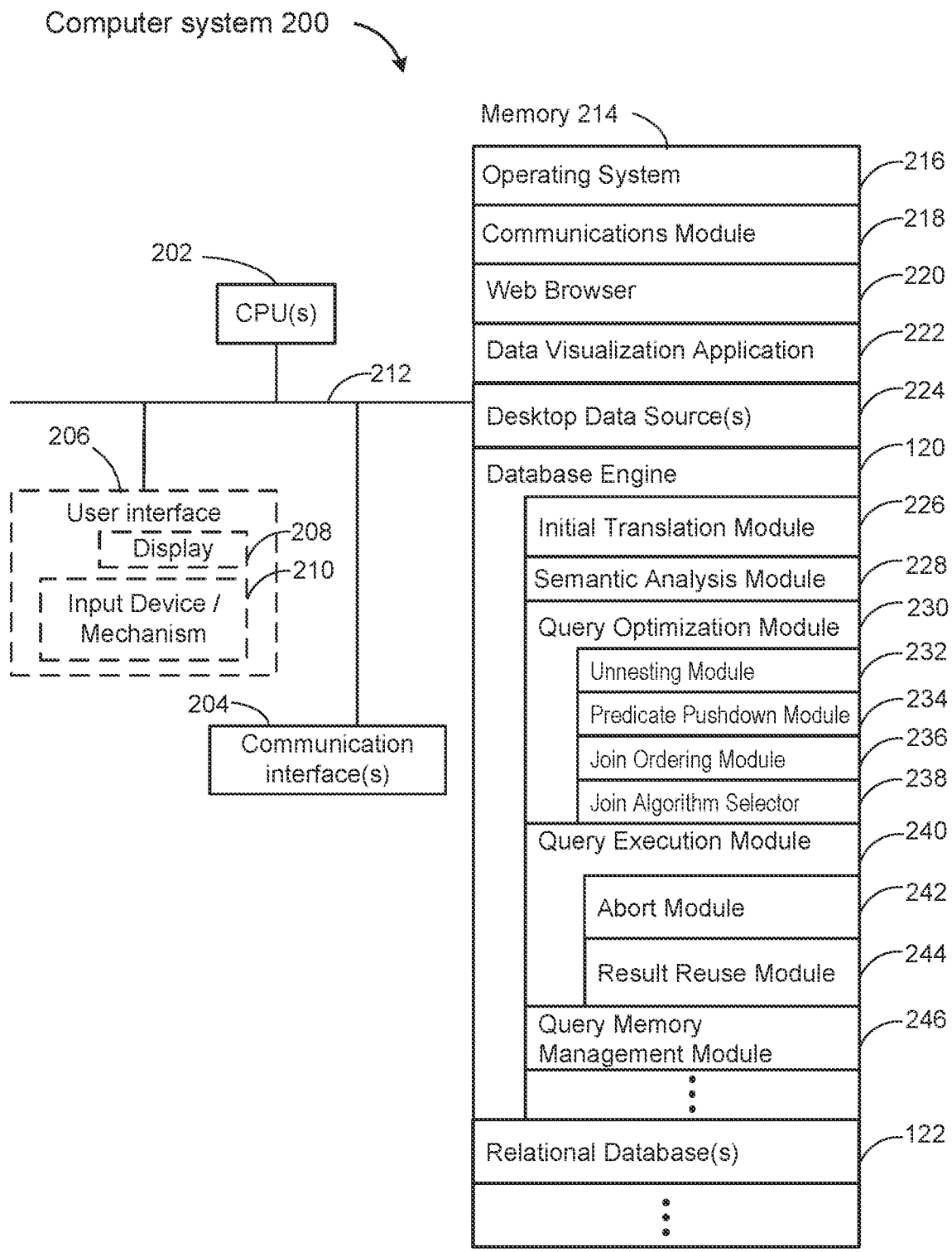
FIG. 2 is a block diagram of a computer system in accordance with some implementations.

FIG. 2 is a block diagram illustrating a computer system 200 in accordance with some implementations. As used herein, the term "computer system" includes personal devices 102, servers (such as a database server 106 or a data visualization server 104) or both. A computer system 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computer system 200 may include a user interface 206 including a display device 208 and one or more input devices/mechanisms 210. In some implementations, the input device/mechanism 210 includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 include a touch screen display (also called a touch sensitive display). In some implementations, the memory 214 includes high-speed random-access memory, such as DRAM, SRAM, DDR RAM, or other random access solid state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPU(s) 202. The memory 214, or alternatively the non-volatile memory device(s) within the memory 214, comprises a computer readable storage medium.

In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computer system 200 to other computers and devices via the one or more communication network interfaces 204 (wired or wireless) and one or more communication networks 108, such as the Internet, other wide area networks, local area networks, metropolitan area networks, and so on;
- a web browser 220 (or other client application), which enables a user 100 to communicate over a network with remote computers or devices. In some implementations, the web browser 220 executes a data visualization web application (not shown) downloaded from a data visualization server 104. In some implementations, a data visualization web application (not shown) is an alternative to storing a data visualization application 222 locally;

a data visualization application 222, which enables users to construct data visualizations from various data sources. The data visualization application 222 retrieves data from one or more data sources, such as a desktop data source 224 (e.g., a CSV file or flat file), a relational database 122 stored locally, or a desktop data source or relational database 122 stored on another device (such as a personal device 102, a data visualization server 104, or a database server 106). The data visualization application then generates and displays the retrieved information in one or more data visualizations;

zero or more desktop data sources 224, which have data that may be used and displayed by the data visualization application 222. Data sources 224 can be formatted in many different ways, such as spreadsheets, XML, files, flat files, CSV files, text files, JSON files, or desktop database files. Typically, the desktop data sources 224 are used by other applications as well (e.g., a spreadsheet application);

a database engine 120, which receives database queries (e.g., from a data visualization application) and retrieves corresponding data from the relational database 122 in response to the database queries; and one or more relational databases 122, which store collections of related data organized according to a predetermined data structure and can be accessed by the database engine 120 using database queries. In some implementations, the relational databases 122 include collections of tables, views, stored procedures, and other database objects.

The database engine 120 further includes a plurality of executable modules. In some implementations, the memory 214, or the computer readable storage medium of the memory 214, stores the following executable modules of the database engine 120, or a subset thereof:

an initial translation module 226, which parses database queries (e.g., SQL database queries) to create operator trees (also referred to as abstract syntax trees or ASTs). This includes determining whether each clause of a database query includes a scalar subquery or any of the predetermined set of predicate subqueries, and adding to a corresponding operator tree a node that specifies a single join operator, a mark join operator, an inner join operator, an outer join operator, a semi join operator, or an anti-semi join operator;

a semantic analysis module 228, which parses the ASTs created from the database queries to create execution plans;

a query optimization module 230, which performs one or more optimization passes on each execution plan to form an optimized execution plan, and includes one or more of:
  an unnesting module 232, configured to unnest the operators (e.g., using one or more mark joins or single joins);
  a predicate pushdown module 234, configured to push down a subset of predicate subqueries of a database query to where data is stored, and filter out a subset of the data accessed for implementing the corresponding predicate subqueries with reduced network traffic;
  a join ordering module 236, configured to reorder operators according to an optimal join order; and
  a join algorithm selector 238, configured to identify a main memory algorithm used to implement each join operator;

a query execution module 240, which executes the optimized execution plans to retrieve result sets from the database 122 (e.g., according to a main memory algorithm). In some implementations, the query execution module 240 includes an abort module 242, which can abort the execution of the code (e.g., upon detecting an out of memory condition). In some implementations, the abort module 242 communicates with the semantic analysis module 228 or the query optimization module 230 to recompile the ASTs after execution is aborted. In some implementations, the query execution module 240 includes a result reuse module 244, which stores and reuses intermediate results that were created during a previous execution that was aborted; and a query memory management module 246, which detects when there is insufficient memory while executing compiled executable machine code. In some instances, the query memory management module 246 communicates with the query execution module 240 (e.g., the abort module 242 therein) to abort execution of the optimized execution plans.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 214 stores a subset of the modules and data structures identified above. Furthermore, in some implementations, the memory 214 stores additional modules or data structures not described above.

Although FIG. 2 shows a computer system 200, FIG. 2 is intended more as a functional description of the various features that may be present rather than as a structural schematic of the implementations described herein. In practice, and as recognized by those of ordinary skill in the art, modules shown separately could be combined and some modules could be separated.

FIGS. 3A-3C illustrate three skeletal tables in an example database schema. The Professors table 300 in FIG. 3A includes the name of each professor, an integer unique identifier for each professor, and a Boolean sabbatical field that indicates whether each professor is on sabbatical. The Courses table 330 in FIG. 3B includes a row for each course, including the course title, an ECTS field that specifies the credits for the course (European Credit Transfer System), and identifies the lecturer using the unique identifier of a professor. The Assistants table 360 in FIG. 3C identifies people who assist professors and others at a university. Each row in the Assistants table specifies the name of the assistant, an identifier for the boss of the assistant, and the job title for the assistant. Note that a single professor can have multiple assistants in different capacities. These tables have many fewer columns than would be expected in an actual database, and do not necessarily represent a good database design, but they are useful to illustrate how some database queries are translated into the extended relational algebra.

In some implementations, a canonical translation method is applied to map a database query to the extended relational algebra. Consider the query:
    select Title, Name
    from Courses, Professors
    where PersID=Lecturer This is translated to $\Pi_{Title,Name}(\sigma_{PersID=Lecturer}(\text{Courses} \times \text{Professors}))$. This canonical translation of the database query creates a cross product of the two tables, applies a selection criterion (persID=Lecturer), then applies a projection (Π) to select only the columns Title and Name. This can be further optimized into an execution plan (e.g., by combining the selection and the cross product into a join operator).

In some instances, a database query includes two or more correlated subqueries. For example, consider:
    select Name, Total
    from Professors, (select sum(ECTS) as Total
        from Courses
        where PersId=Lecturer)

Here, a subquery is included in the from clause, and the subquery depends upon the outer query (i.e., the subquery executes once for each professor in the Professors table 300). This correlated subquery is translated as a dependent join as follows:

$$\text{Professors} \bowtie (\Gamma_{\theta,total:sum(ECTS)} \sigma_{PersID=Lecturer}\text{Courses}).$$

In some implementations, a query optimization module 230 will replace the dependent join with an inner join, a semi join, an anti-semi join, a left outer join, a full outer join, a single join, or a mark join as a result of unnesting.

In some instances, a database query includes a subquery that is expected to return exactly one column value from one row (i.e., a scalar subquery). Such a query is translated into a single join operator. The value of the scalar subquery expression is a value of a select list item of the subquery. If the subquery does not return any row, then the value of the scalar subquery expression is NULL. Consider the following example query:
    select PersId, p.Name, (select a.Name
        from Assistants a
        where a.Boss=p.PersId
        and JobTitle='personal assistant')
    from Professors p This query is intended to select the name of the personal assistant for each professor. Note, however, that nothing in the schema would prevent a single professor from having more than one person designated as a "personal assistant" (a professor may also have zero people designated as a "personal assistant"). The database engine 120 determines that this query includes a scalar subquery, and accordingly, translates the subquery to a single join operator as follows:

$$\text{Professors} \bowtie_{true}^{1} \sigma_{PersID=Boss \land JobTitle='personal\ assistant'}(\text{Assistants})$$

In some implementations, the query optimization module 230 of the database engine 120 further moves the correlated predicate into the join operator during subsequent query optimization, resulting in:

$$\text{Professors} \bowtie_{PersId=Boss}^{1} \sigma_{JobTitle='persoanl\ assitant'}(\text{Assistants}).$$

In some instances, a database query includes a predicate subquery that arises from EXISTS, NOT EXISTS, UNIQUE, or a quantified comparison. For example, consider the following query:
    select *
    from Professors
    where exists (select *
        from Courses
        where Lecturer=PersId)
        or Sabbatical=true The database engine 120 determines that this query includes an EXISTS subquery, and accordingly, translates the EXISTS subquery into a mark join operator as follows:

$$\sigma_{(m \lor Sabbatical)}(\text{Professors} \bowtie_{PersID=Lecturer}^{M:m} \text{Courses})$$

Another example of creating a mark join arises from the following database query:
    select Title, ECTS=any (select ECTS from Courses c2
        where Lecturer=123) someEqual
    from Courses c1

In some implementations, this query is translated directly into the following mark join:

$$\text{Courses } c_1 \bowtie_{c_1.ECTS=c_2.ECTS}^{M:someEqual} \sigma_{c_2.Lecturer=123}\text{Courses } c_2$$

The mark join has a result column someEqual, which is either TRUE, FALSE, or NULL (i.e., unknown).

Figure 4:
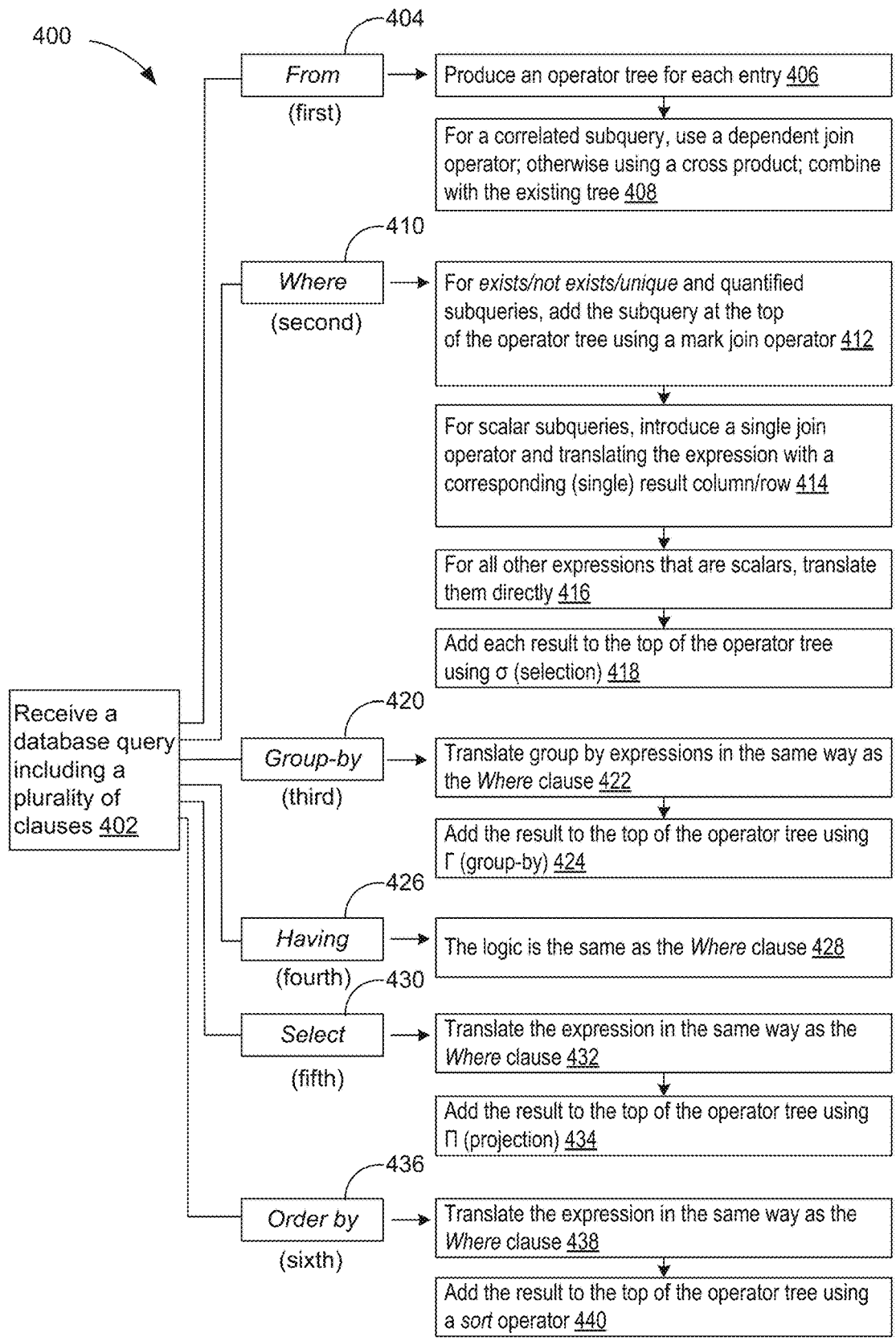
FIG. 4 is an example process for translating a database query into an operator tree in accordance with some implementations.

FIG. 4 is an example process 400 implemented by an initial translation module 226 in a database engine 120 for translating a database query into an operator tree in accordance with some implementations. The database query includes a plurality of clauses. In some implementations, each of the plurality of clauses has a clause type that is one of: from clause, where clause, group by clause, having clause, select clause, and order by clause. In some implementations, the database query has at most one clause of each clause type (except for subqueries, each of which has its own set of clauses). In some implementations, forming the operator tree comprises translating the plurality of clauses in an order according to clause type, in the order: 1) from clause, 2) where clause, 3) group by clause, 4) having clause, 5) select clause, and 6) order by clause. In some implementations, operators translated for the plurality of clauses are incrementally added at a top node of an interim operator tree as the clauses are processed in order.

FIG. 4 illustrates an exemplary process 400. After receiving (402) a database query, the database engine 120 processes the clauses in order. The from clause 404 is processed first. The database engine 120 translates the clause from left to right, and produces (406) an operator tree for each entry in the clause. When there is a correlated subquery, the operator tree includes (408) a dependent join operator to represent the correlated subquery. When there is no correlation, the operator tree is combined (408) with a previous tree using a cross product. As a result, the from clause is translated as a single operator tree.

The where clause 410 is processed next. The database engine 120 uses (412) a mark join operator to represent an exists subquery, a not exists subquery, a unique subquery, or a quantified subquery. The database engine 120 adds the mark join operator to the top of the operator tree. For each scalar subquery identified in the where clause, the database engine 120 introduces (414) a single join operator to represent the scalar subquery and adds the single join operator to the top of the operator tree. For each scalar expression (not a subquery) in the where clause, the expression is translated (416) directly. Each mark join operator, single join operator, or directly translated expression is added (418) to the top of the operator tree using a selection operator σ.

The group by clause 420 (if it exists) is processed next. The database engine 120 uses (422) a mark join operator, a single join operator, or direct translation to represent the group by expressions in the same way that the database engine 120 processes a where clause in operations 412-416. Each mark join operator, single join operator, or directly translated expression is added (424) to the top of the operator tree using a group by operator Γ.

The database engine 120 next processes the having clause 426 (if it exists). The logic for the having clause is (428) the same as the logic for the where clause in operations 412-416. Like a where clause, each mark join operator, single join operator, or directly translated expression is added to the top of the operator tree using a selection operator σ.

The database engine 120 processes the select clause 430 next. The select clause is translated (432) in the same way the database engine 120 translates a where clause in operations 412-416. Each mark join operator, single join operator, or directly translated expression is added (434) to the top of the operator tree using a projection operator Π.

Finally, the database engine 120 processes the order by clause 436, if it exists. The database engine 120 translates (438) the order by clause in the same way it translates a where clause in operations 412-416. Each the mark join operator, single join operator, or the directly translated expression is added (438) to the top of the operator tree using a sort operator.

The process 400 translates a database query into the extended relational algebra without having to fall back to mutual recursion between operators and expressions. In particular, the translation process 400 can be optimized by a query optimization module 230, leveraging efficient join implementations. More details on query optimization are discussed below with reference to FIG. 5.

Figure 5:
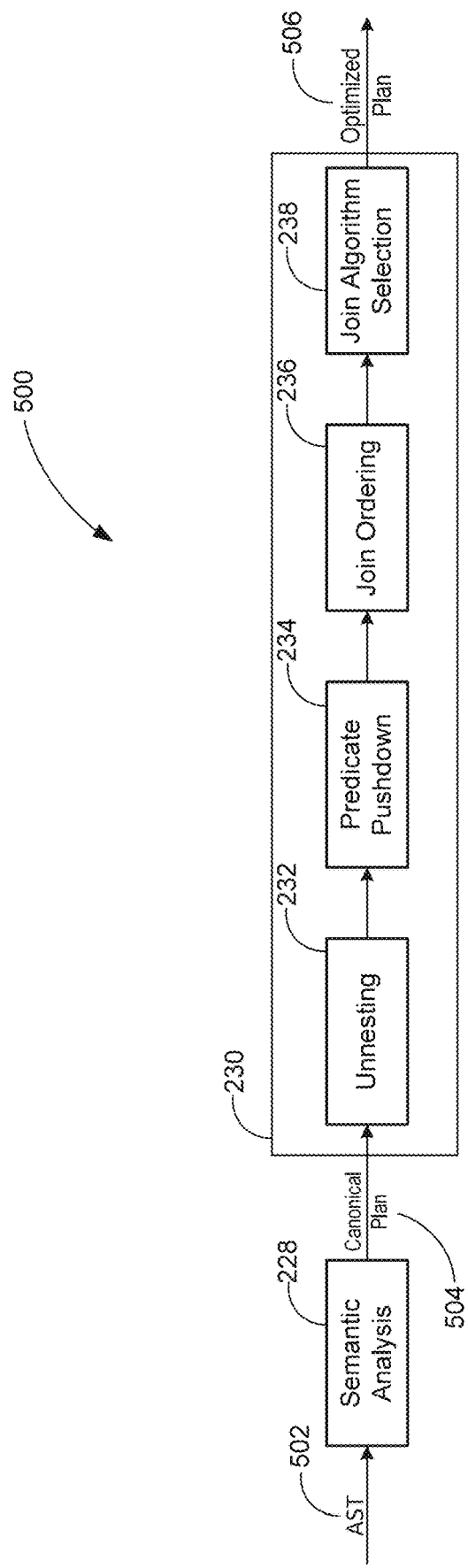
FIG. 5 is a block diagram of a query optimization process for a database engine in accordance with some implementations.

FIG. 5 is a block diagram of a query optimization system 500 implemented by a database engine 120 of a computer system 200 in accordance with some implementations. The query optimization system 500 includes a semantic analysis module 228 and a query optimization module 230. The semantic analysis module 228 parses an abstract syntax tree (AST) 502 (e.g., an operator tree) created from a database query by the initial translation module 226, and builds an initial execution plan 504 in the extended relational algebra. This initial plan is sometimes referred to as the "canonical" execution plan. In some implementations, the initial execution plan includes only inner joins, outer joins, left mark joins, and single joins. Other variants are added by the query optimization module 230 to improve execution performance.

The query optimization module 230 performs one or more optimization passes on the canonical plan 504 to form an optimized execution plan 506. In some implementations, the query optimization module 230 includes an unnesting module 232, a predicate pushdown module 234, a join ordering module 236, and a join algorithm selector 238. In some implementations, the unnesting module 232 is configured to unnest any query or subquery independently of whether the query or subquery is associated with a correlated subquery. Mark joins and single joins are building blocks used by the unnesting module 232 to express the corresponding query or subquery in the extended relational algebra. More details on the unnesting process are provided by Thomas Neumann and Alfons Kemper in "Unnesting Arbitrary Queries," *Datenbanksysteme fur Business, Technologie und Web* (*BTW*), 16. Fachtagung des GI-Fachbereichs "Datenbanken und Informationssysteme" (*DBIS*), 4.-6.3.2015 in Hamburg, Germany, Proceedings, pages 383-402, 2015, which is hereby incorporated by reference in its entirety.

Some implementations include a predicate pushdown module 234, which pushes down a subset of predicate subqueries of a database query to where the data is stored. By filtering the data at the source, network traffic is reduced.

The join ordering module 236 reorders the execution of join operators in an optimal order. In some implementations, the order of the plurality of join operators is determined according to a cost-based join enumeration method. In some instances, the plurality of join operators includes a first mark join operator and a first inner join operator, and changing the order of the plurality of join operators in the operator tree includes performing the first mark join operator prior to the first inner join operator. For example, consider the following database query using the tables 300, 330, and 360 in FIGS. 3A-3C:

select *
from Professors p, Assistants a
where p.PersId=a.Boss
  and (exists (select *
    from Courses c
    where c.Lecturer=p.PersId)
  or p.Sabbatical=true)

A mark join associated with the EXISTS clause is executed before an inner join for joining with Assistants as follows:

$$(\sigma_{(m \vee Sabbatical)}(\text{Professors} \bowtie_{PersId=Lecturer}^{M:m} \text{v-Courses})) \bowtie_{PersId=Boss} \text{Assistants}$$

If there are more assistants than professors, performing the mark join first is faster than starting with the inner join. In some implementations, due to transitivity of the join predicates (Pers/Id=Boss and Lecturer=PersId), a mark join between Course and Assistants is implemented first. The decision between the three join orders is done by a cost-based join enumeration method. In some implementations, the database engine 120 uses a graph-based dynamic programming method (also called DPhyp) for enumerating connected components without cross products. In some implementations, both the cost-based join enumeration method and the graph-based dynamic programming method determine the order of joins according to ordering constraints of non-inner joins.

In some implementations, the database engine 120 has a left variant (e.g., left mark join) and a right variant (e.g., right mark join) for a join operator. Both variants of the join operator semantically produce the same result (except with left and right inputs swapped). However, in some situations, different join variants can lead to different query execution performance. For example, in hash-based execution, a hash table is built from a left input (the build input). A tuple from a right input (the probe input) results in a hash table lookup in the hash table. Because hash table insertion is usually slower than lookup, the query optimization module 230 typically swaps the argument order of joins so that the table with fewer rows is on the left (e.g., based on cardinality estimates).

In some instances, the query optimization module 230 translates a mark join into a semi join or anti-semi join, thereby avoiding maintaining a marker and achieving a faster processing rate. For example, consider the following database query based on the tables 300 and 330 in FIGS. 3A and 3B:

select *
from Professors
where exists (select *
  from Courses
  where Lecturer=PersId)

This is translated into a mark join initially, and replaced by a semi join (Professors ⋈ Courses) by the query optimization module 230.

In some implementations, the query optimization module 230 translates outer joins into inner joins when there is a null-rejecting predicate. For example, consider the following example where converting to an inner join is possible:

select Title, Name
        from Courses right outer join Professors on PersID=Lecturer
    where ECTS>1

In some implementations, the query optimization module 230 replaces a left single join with a left outer join when a subquery is known to compute at most one row. For example, consider the following database query:

select Name, (select sum(ECTS) as Total
        from Courses
        where PersId=Lecturer)
    from Professors In this case, the left mark join can be replaced by a left outer join because the subquery is an aggregate without a group by clause (and thus produces at most a single row).

A join algorithm selector 238 selects specific join operator implementations. FIG. 6A provides pseudocode 600 for an equality hash join in accordance with some implementations. The join algorithm selector 238 determines a main-memory algorithm for the equality hash join ($R \bowtie_{a=b} S$) according to the pseudocode 600. Here, a hash table holds indexed hash values for the tuples from one side (the hash of the attribute a), and the other side probes the hash table to find join partners (using a hash of the attribute b).

FIG. 6B provides pseudocode 610 for an equality hash join between columns of mixed data types in accordance with some implementations. The equality join operator is more involved because of the need to cast between data types. For example, consider the join $R \bowtie_{a=b} S$, when a has the data type numeric (6,3) and b has the data type integer. The internal representation of numbers is different. The integer value 3 should join to the numeric value 3.000, but not to the numeric value 3.001. Typically, using native hash functions for different data types does not yield the correct results. In some implementations, a join is performed on the most restrictive data type. In this example, the integer data type is more restrictive than the numeric (6,3) data type. Any value that cannot be represented exactly as an integer does not have a join partner, and thus can be omitted from the hash table. The pseudocode 610 in FIG. 6B assumes b has the most restrictive data type. By double casting the data values for the broader data type, only those values that can be correctly represented by the more restrictive data type are added to the hash table. Although the pseudocode here assumes that a is cast to the type of b, some implementations (or in some instances), the roles of a and b can be reversed. Sometimes the most restrictive data type is also called the "compare type," and the corresponding logic refers to "if cast was exact."

Figure 6C:
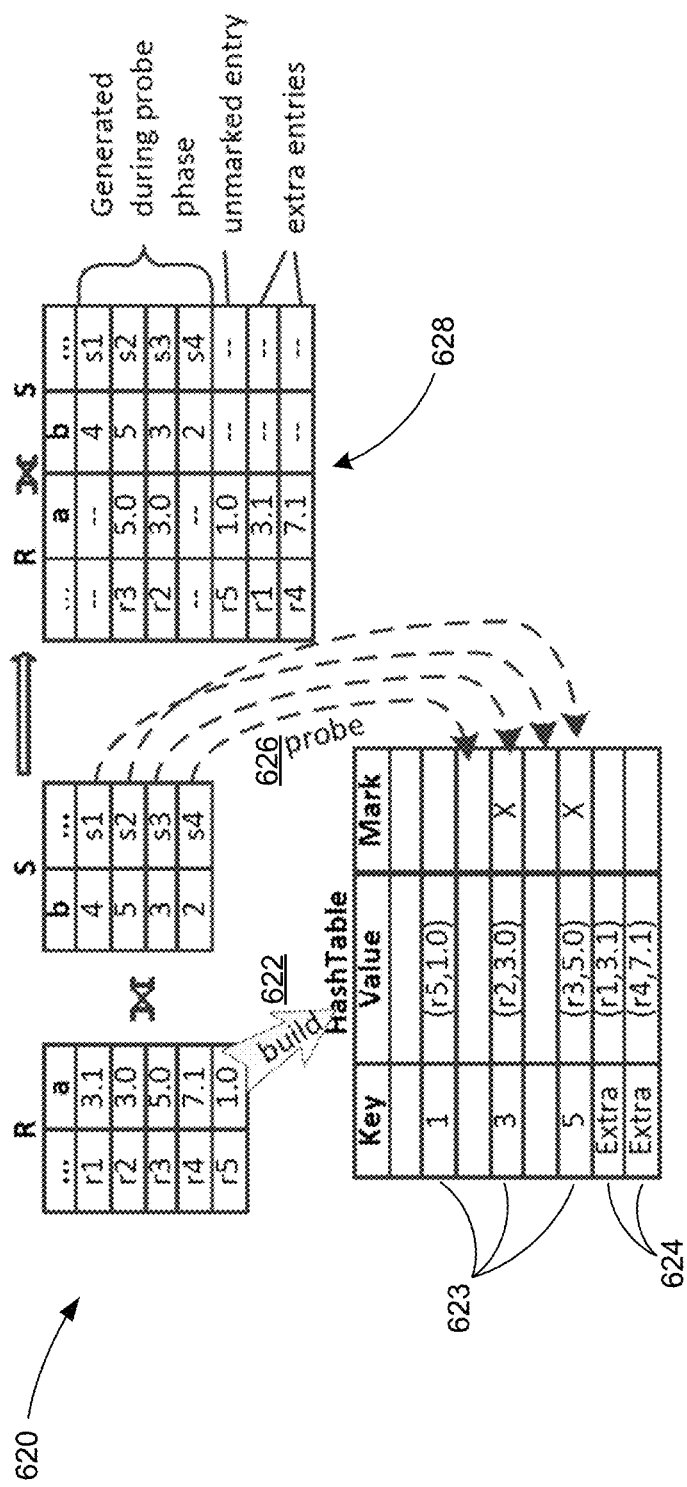
FIG. 6C illustrates a process for implementing a full outer hash join using a main-memory algorithm in accordance with some implementations.
Figure 6D:
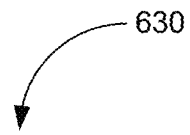
FIG. 6D provides pseudocode for a full outer hash join ($R \bowtie_{a=b} S$) in accordance with some implementations.

FIG. 6C shows an example process 620 for implementing a full outer hash join ($R \bowtie_{a=b} S$) using a main-memory algorithm in accordance with some implementations, and FIG. 6D provides pseudocode 630 directed to the full outer hash join in FIG. 6C. Outer joins output not only the same tuples as inner joins, but also all tuples that do not find join partners. In some implementations, the tuples that do not have join partners are marked. Each hash table entry has one additional byte that is initially set to 0 (not joined). The additional byte is set to 1 (joined) when (if) a join partner is found. Each tuple that does not have a join partner is marked after the outer join is completed. For the tuples from a right-hand side, it is known whether each of the tuples has a join partner or not. A left or right outer join is implemented using a subset of the main-memory algorithm illustrated in the pseudocode 630.

In accordance with the pseudocode 630, each of the tuples in R is processed and stored (622) in the hash table, and initially set as unmarked. When the join fields have different data types, the hash table rows are different depending on whether the field value has an exact cast to the more restrictive data type. Here, the data values 1.0, 3.0, and 5.0 have exact casts to an integer data type, so their index keys 623 are saved in the hash table. On the other hand, the data values 3.1 and 7.1 cannot be exactly cast as integers, so their key values are not included in the index. Instead, corresponding extra rows 624 are created. If this were an inner join or a right outer join, the extra rows for R would not be created. For left and full outer joins, the extra rows are stored in an extra hash table bucket.

Next, the tuples from S are processed. The local markers for the S tuples are initially set to zero, and the process probes (626) the hash table to identify potential join candidates. When a join candidate is found in the hash table, both the corresponding S and R tuples are marked as having join partners before emitting the joined tuple. After probing the hash table, it is therefore determined whether each S tuple has a join partner. If an S tuple does not have a join partner, the process emits the tuple after padding it with NULL values for the fields from R. After processing the S tuples, the process does a final sweep over the hash table and emits all tuples that do not have join partners. In some instances, this includes a subset of tuples that have data type mismatches. The final result 628 of the join includes rows arising for four different reasons: (1) s1 and s4 from S have no matching partner from R; (2) r3 and r2 from R match to s2 and s3 from S; (3) r5 from R has no matching entry from S; and (4) r1 and r4 from R could not possibly have matching partners from S because it would be impossible for an integer valued field to match the value 3.1 or 7.1. In some circumstances, these last two reasons are considered together because they have the same net result (no partner in S).

FIG. 6E provides pseudocode 640 for a left semi hash join in accordance with some implementations. Tuples are marked when semi joins (or anti-semi joins) are implemented. In some implementations, in semi joins, a tuple emitted when it is found by a probe and the tuple has not been marked before. In some implementations, in anti-semi joins, a tuple is emitted when the tuple does not have a join partner. In some implementations, if a semi join is executed on multiple threads, only one of the threads is allowed to emit each particular r value. In order to guarantee this, some implementations use an atomic instruction that combines emitting a r value with updating the marker for the r value. Conversely, in some implementations, anti-semi joins mark the tuple, but do not emit it. Instead, an anti-semi join uses a final pass through the hash table to emit unmarked tuples.

FIG. 6F provides pseudocode 650 for a left single hash join in accordance with some implementations. In some implementations, a single join uses the same marking method as a left outer join, as explained above with reference to FIG. 6D. In some implementations, a single join uses a marker to detect a plurality of output values. This is an effective way to implement a single join. In practice this means that a single join is for free and costs substantially the same as an outer join. In some implementations, the left single join variant is an extension of a left outer join. Analogously, in some implementations, a right single join is an extension of a right outer join that throws an exception when more than one join partner is found.

FIG. 6G provides pseudocode 660 for a left mark hash join in accordance with some implementations. In some implementations, a mark join uses a similar marking method as those used to mark a left outer join (FIG. 6D) and a left single hash join (FIG. 6F). In some implementations, the marking method for the mark join results in marks having a value of TRUE (has a join partner), FALSE (has no join partner), or NULL (unknown because there is a join partner where the comparison result is NULL, but none where the comparison is TRUE). In some situations, a NULL implicitly behaves like a FALSE (e.g., in a disjunctive where clause), and the NULL case can be simplified to be identical to the FALSE case. In some situations, referring to FIG. 6G, extra logic for NULL is needed, including two extra lists. A first list is used for values that fall outside the domain of the comparison type, and marked as FALSE (i.e., having no join partner). A second list is used for tuples having a join attribute of NULL. All comparisons with this tuple result in NULL, and therefore, are skipped. The tuples having the join attribute of NULL are statically marked as NULL and put in the second list.

While implementing the mark join, the database engine 120 checks for NULL values in the join attribute of S. If it encounters a NULL value, the database engine 120 determines that each output tuple has the marker that has a value of TRUE or NULL, but not a value of FALSE (because the NULL value would "join" with all of them). If NULL is not encountered, the database engine 120 does a hash table lookup and marks all matching tuples with TRUE. Afterwards, the database engine 120 scans the hash table and outputs all tuples with their respective markers. Under some circumstances, if the database engine 120 does not find any tuples in S at all, an initial NULL marker from a "null" list is converted into FALSE. If a tuple is marked as FALSE and the database engine 120 identifies a NULL value in S, the whole tuple is now marked as NULL, and the NULL value implicitly joins with it. It is noted that a right mark join is analogous to that of the left mark join shown in FIG. 6G, except that the database engine 120 marks a right hand side.

Figure 6H:
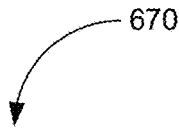

FIG. 6H provides pseudocode 670 for a full outer non-equality blockwise nested loop join in accordance with some implementations. In some situations, a join predicate includes an expression that cannot be evaluated using a hash join. In some situations, a join includes a quasi equality join that is nearly equivalent to (e.g., substantially close to) an equality join (e.g., $R \bowtie_{a=b \wedge c>d} S$). The predicate of the quasi equality join has an equality component that can be evaluated using a hash join. The predicate of the quasi equality join also has a non-equality component. For an inner join, the corresponding predicate is split (e.g., $R \bowtie_{a=b \wedge c>d} = \sigma_{c>d}(R \bowtie_{a=b} S)$). For an outer join, a corresponding predicate cannot be split, and additional restrictions are evaluated directly while the join is implemented in order to avoid incorrect results. Thus, in some implementations, a combined evaluation method using the hash join and additional restrictions is applied. In some implementations, extra logic is applied to evaluate an expression during the hash join. It is noted that in some implementations, a non- equality part of a join condition (e.g., the non-equality component of the predicate of the quasi equality join) returns NULL as a result. When the join condition includes a mark join, the NULL result returned by the non-equality part results in a NULL marker if a current marker is FALSE for the mark join.

For some complex predicates, hash joins are not possible. The database engine 120 needs a corresponding main-memory algorithm to process the predicate. For example, the database engine 120 processes complex predicates using a blockwise nested loop join, where chunks of R are loaded into memory and joined with tuples from S. This main memory algorithm has an asymptotic cost that is substantially equal to that of a naive nested loop join. However, in practice, a blockwise nested loop join is much faster (e.g., by orders of magnitude).

In some implementations, a join initializes an empty buffer, and then loads as many tuples from R into the buffer as possible. When the buffer is full, joinBuffer is called to join all tuples from S with current buffer content in the buffer, mark the join partners, and emit results. After reading S, the database engine 120 emits all unmarked tuples from the buffer after padding the unmarked tuples with NULL, and clears the buffer. This process continues until R has been processed completely. Finally, all unmarked tuples from S are emitted while being padded with NULL.

In some implementations, the marking uses the same logic as in the equality case. For example, to mark a left-hand side, the database engine 120 uses one byte per tuple in the buffer for marking. To mark a right-hand side that is accessed multiple times without being materialized in memory, the database engine 120 maintains an additional vector and spools it to disk. Some implementations use an associated data structure that assigns a bit value to each tuple and uses interval compression. In many cases the number of tuples that qualify (or conversely, fail to qualify) is small, so the associated data structure stores only a small amount of data.

FIG. 7 shows a table 700 that illustrates join types used in two benchmark database queries (TPC-H and TPC-DS), both before optimization and after optimization. Switching from a conventional approach with mutual recursion into one the uses the full array of join types (including single joins and mark joins) transforms an $O(n^2)$ algorithm into an $O(n)$ algorithm. Numerical comparisons have limited value, because differences get huge even for modest data sizes. Note that all of the join types occur in these benchmark queries. Corresponding runtime effects of avoiding mutual recursion can be substantially large.

In the TPC queries, all join types occur, either before or after optimization. There are fewer TPC-H queries than TPC-DS queries, and TPC-H queries are less complex. In TPC-H, single joins do not occur and all of the left mark joins can be translated to four left or right semi (anti) join variants. In TPC-DS, both single and mark joins are needed even after optimization. The table 700 also shows that both the right and left variants are chosen by the query optimization module 230. Thus, the table 700 indicates that the "zoo" of join variants is needed, and a query optimization module 230 benefits from having all these variants.

Consider the following database query on the TPC-H data set (scale factor 1):
select p_name,
   (select l_orderkey
   from lineitem
   where l_partkey=p_partkey
   and l_returnflag='R' and l_linestatus='O')
from part This query demonstrates the performance benefits of a single join. Using the disclosed additional join types, this database query is evaluated in 17 milliseconds (with one thread), while a conventional approach using mutual recursion requires 26 hours. The reason for the abysmal performance with the conventional approach is that it has to perform a full table scan for each tuple of the part table, which results in quadratic runtime. This illustrates that using the disclosed additional join types can speed up the database querying process, and the degree of speedup is even larger when the data set is larger.

In accordance with some implementations, the database engine 120 includes a query translation and optimization pipeline. As SQL has evolved to allow nested subqueries in different parts of a database query, there is a practical need for advanced join operators (e.g., single joins and mark joins) to avoid recursive evaluation with an unbearable $O(n^2)$ runtime. The TPC-H and TPC-DS benchmarks reveal that all join variants discussed herein are actually used in these query sets. The new join operators are involved in logical query translation and optimization, and impact the physical algorithmic implementation of these join operators.

Figure 8A:
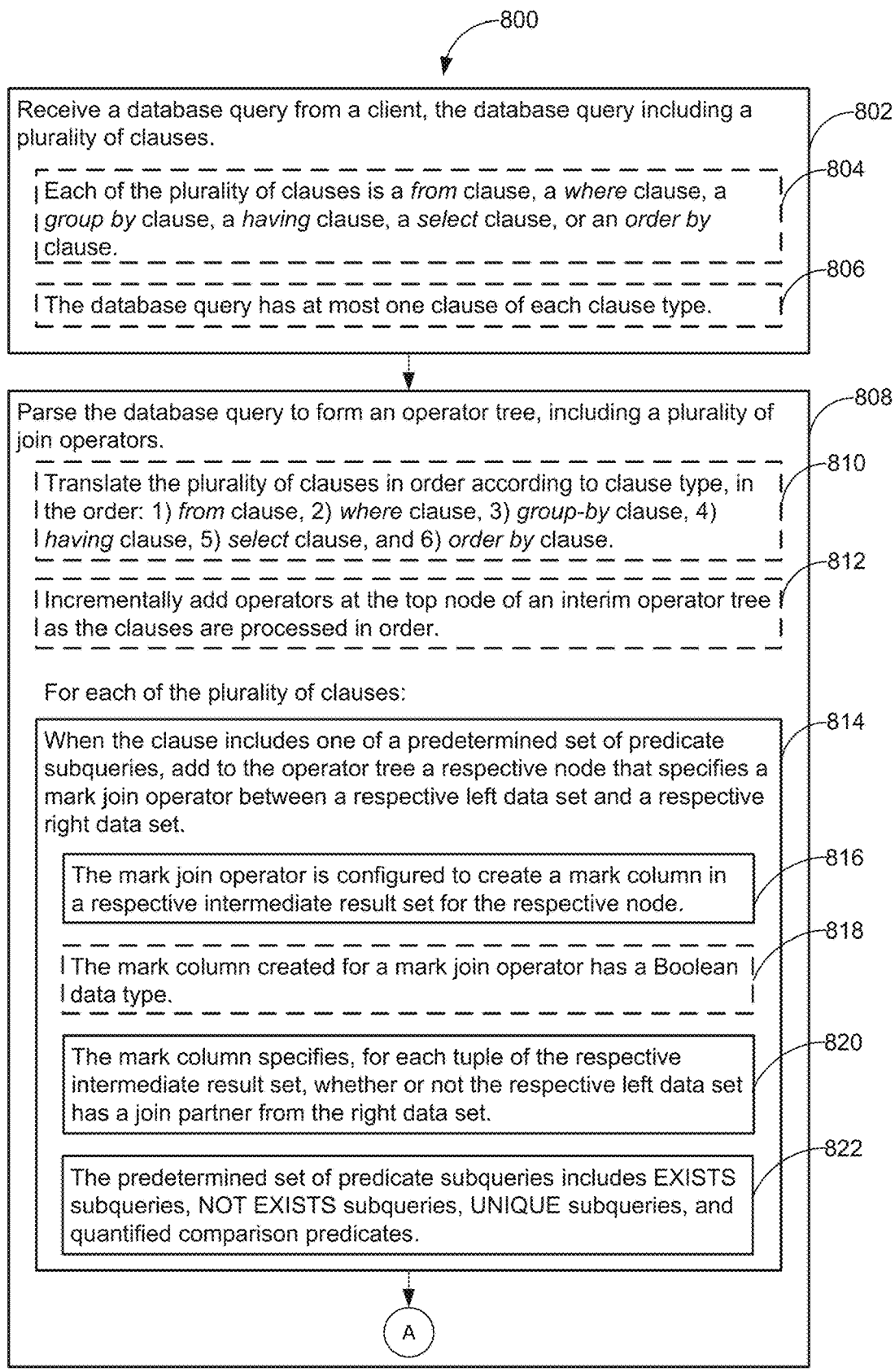
FIGS. 8A-8C provide a flowchart of a method for retrieving data from a database in accordance with some implementations.
Figure 8B:
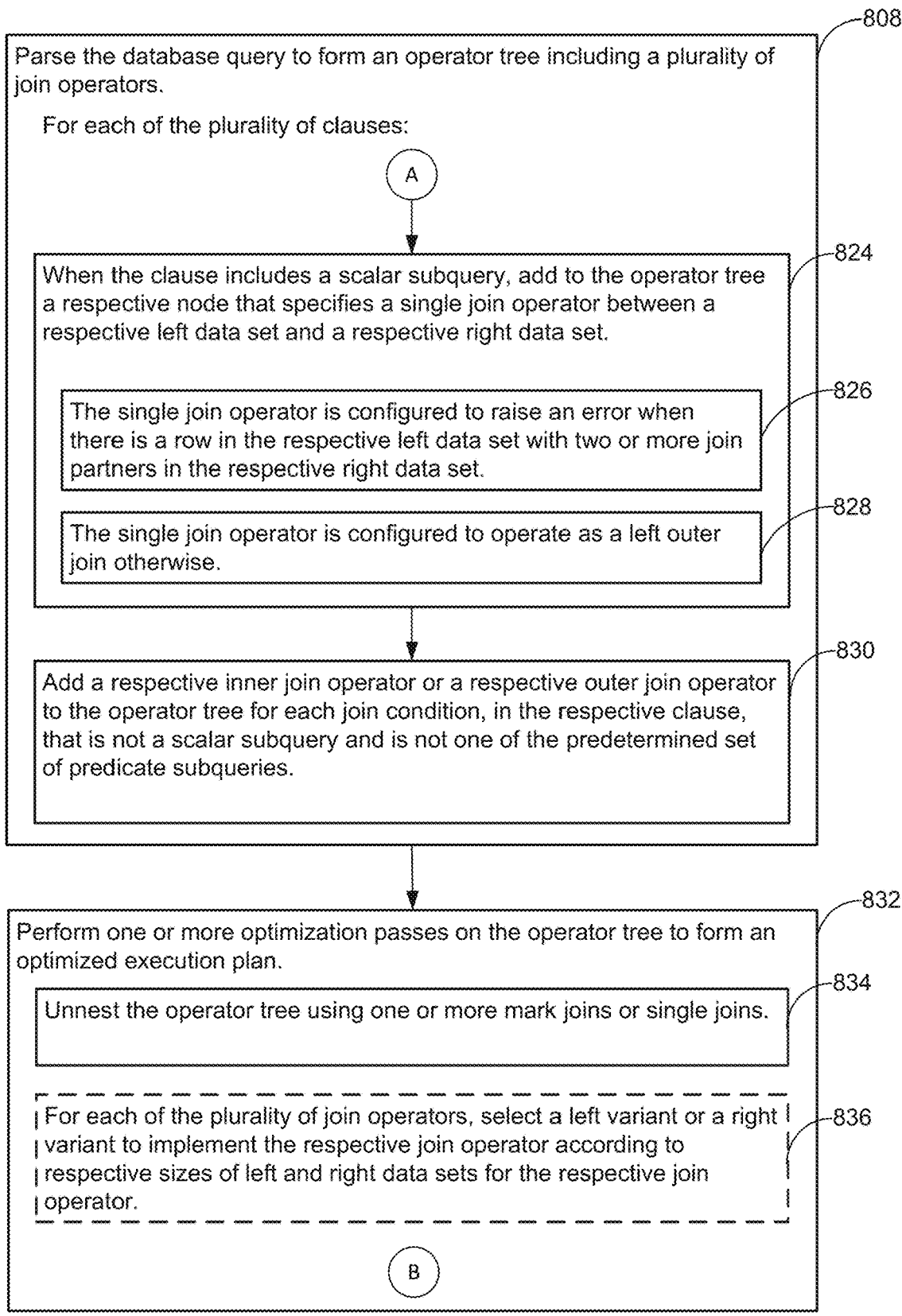
Figure 8C:
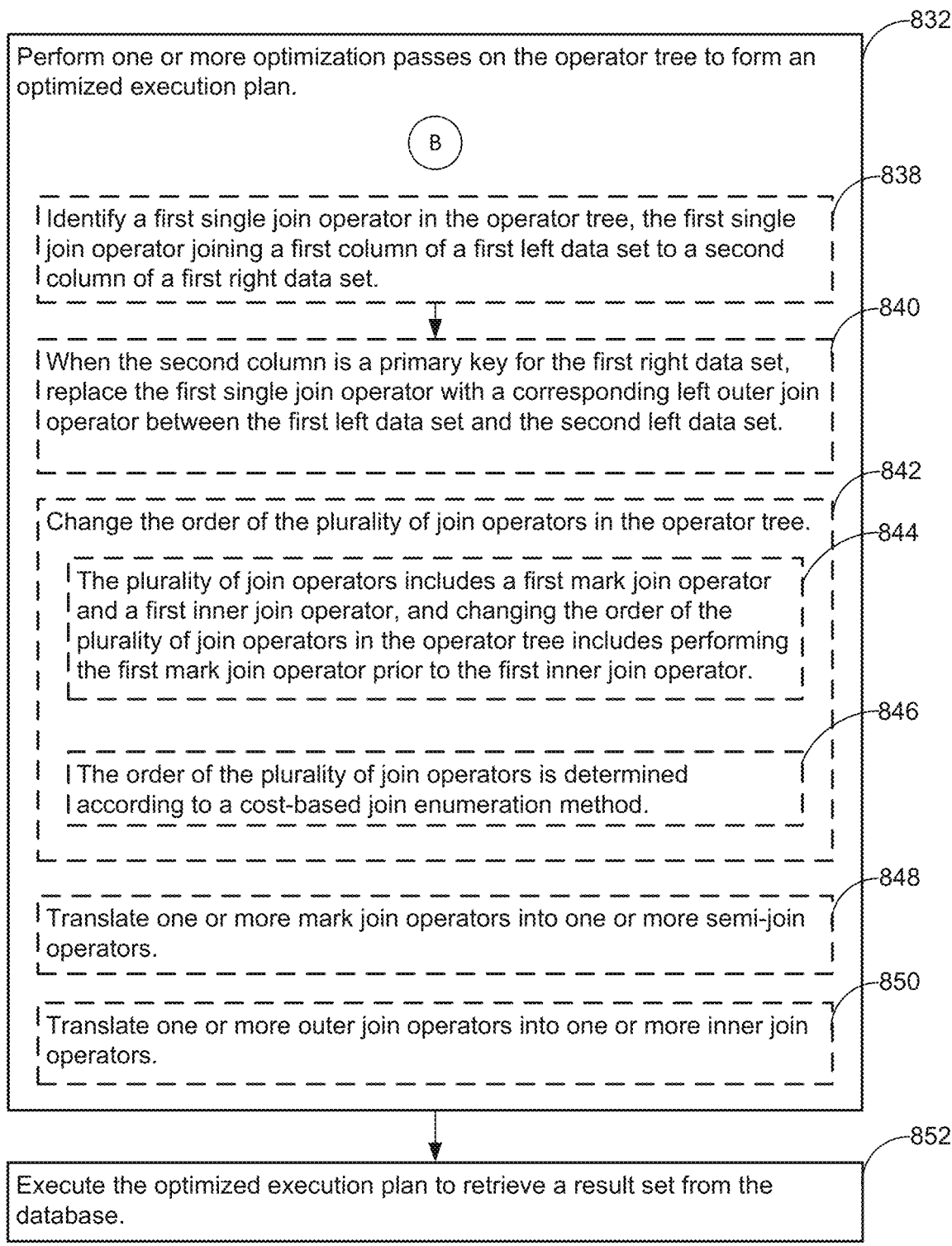

FIGS. 8A-8C provide a flowchart of a method 800 for retrieving data from a database in accordance with some implementations. In some implementations, the method 800 is performed by instructions that are stored on a non-transitory computer readable storage medium and are executed by one or more processors of a computer system 200. Each of the operations shown in FIGS. 8A-8C may correspond to instructions stored in computer memory or on a non-transitory computer readable storage medium (e.g., the memory 214 of the computer system 200) of the computer system 200. The computer readable storage medium may include a magnetic or optical disk storage device, solid state storage devices such as flash memory, or other non-volatile memory device or devices. The instructions stored on the computer readable storage medium may include one or more of: source code, assembly language code, object code, or other instruction format that is interpreted by one or more processors. Some operations in the method 800 may be combined and/or the order of some operations may be changed.

In accordance with the method 800 for retrieving data from the database, a database engine 120 of the computer system 200 receives (802) a database query from a client. Each of the plurality of clauses has (804) a clause type that is one of: from clause, where clause, group by clause, having clause, select clause, and order by clause. In some implementations, the database query has (806) at most one clause of each clause type (not including the clauses within subqueries).

After receiving the database query, the database engine 120 parses (808) the database query to form an operator tree including a plurality of join operators. In some implementations, forming the operator tree includes (810) translating the plurality of clauses in an order according to clause type, in the order: 1) from clause, 2) where clause, 3) group by clause, 4) having clause, 5) select clause, and 6) order by clause. In some implementations, the join operators are incrementally added (812) at the top node of an interim operator tree as the clauses are processed in order. More details for translating each of the above clause types are discussed above with reference to FIG. 4.

For each of the plurality of clauses, when the respective clause includes one of a predetermined set of predicate subqueries, the database engine 120 adds (814) to the operator tree a respective node that specifies a mark join operator between a respective left data set and a respective right data set. The mark join operator is configured to create (816) a mark column in a respective intermediate result set for the respective node. In some implementations, the mark column created for a mark join operator has (818) a Boolean data type. The mark column specifies (820), for each tuple of the respective intermediate result set, whether or not the respective left data set has a join partner from the right data set. The predetermined set of predicate subqueries includes (822) EXISTS subqueries, NOT EXISTS subqueries, UNIQUE subqueries, and quantified comparison predicates.

For each of the plurality of clauses, when the respective clause includes a scalar subquery, the database engine 120 adds (824) to the operator tree a respective node that specifies a single join operator between a respective left data set and a respective right data set. The single join operator is configured to raise (826) an error when there is a row in the respective left data set with two or more join partners in the respective right data set, and the single join operator is configured (828) to operate as a left outer join otherwise. In addition, the database engine 120 adds (830) a respective inner join operator or a respective outer join operator to the operator tree for each join condition in the respective clause that is not part of a scalar subquery and not one of the predetermined set of predicate subqueries.

After forming the operator tree, the database engine 120 performs (832) one or more optimization passes on the operator tree (and/or the corresponding execution plan) to form an optimized execution plan. The one or more optimization passes includes (834) unnesting operators using one or more mark joins or single joins. In some implementations, performing the one or more optimization passes further includes (836), for each of the plurality of join operators, selecting a left variant or a right variant to implement the respective join operator according to respective sizes of left and right data sets for the respective join operator. In some implementations, a first single join operator is identified (838) in the operator tree, and the first single join operator joins a first column of a first left data set to a second column of a first right data set. When the second column is a primary key for the first right data set, the database engine then replaces (840) the first single join operator with a corresponding left outer join operator between the first left data set and the second left data set. In some implementations, performing one or more optimization passes includes (842) changing the order of the plurality of operators. In some implementations, the plurality of operators includes (844) a first mark join operator and a first inner join operator, and changing the order of the plurality of join operators includes performing the first mark join operator prior to the first inner join operator. In some implementations, the order of the plurality of join operators is determined (846) according to a cost-based join enumeration method.

In some implementations, performing the one or more optimization passes includes (848) translating one or more mark join operators to one or more semi join operators. In some implementations, performing the one or more optimization passes includes (850) translating one or more outer join operators to one or more inner join operators. More details on the one or more optimization passes are provided above with reference to FIGS. 5-7.

The database engine 120 executes (852) the optimized execution plan to retrieve a result set from the database.

It should be understood that the particular order in which the operations in FIGS. 8A-8C have been described is merely exemplary and are not intended to indicate that the described order is the only order in which the operations could be performed. One of ordinary skill in the art would recognize various ways to cache and distribute specific data as described herein. Additionally, it should be noted that details of other processes described with respect FIGS. 1-7 are also applicable in an analogous manner to the method 800 described above with respect to FIGS. 8A-8C. For brevity, these details are not repeated here.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for retrieving data from a database, comprising:
    at a computer system having one or more processors and memory storing one or more programs configured for execution by the one or more processors:
        receiving a database query from a client, the database query including a plurality of clauses;
        parsing the database query to form an operator tree including a plurality of join operators, including, for a first clause of the plurality of clauses:
            in accordance with a determination that the first clause includes one of a predetermined set of predicate subqueries, adding to the operator tree a respective node that specifies a mark join operator between a respective left data set and a respective right data set;
            in accordance with a determination that the first clause includes a scalar subquery, adding to the operator tree a respective node that specifies a single join operator between a respective left data set and a respective right data set; and
            in accordance with a determination that the first clause does not include a scalar subquery and does not include any of the predetermined set of predicate subqueries, adding a respective inner join operator or a respective outer join operator to the operator tree for each join condition in the first clause;
        performing one or more optimization passes on the operator tree to form an optimized execution plan; and
        executing the optimized execution plan to retrieve a result set from the database.

2. The method of claim 1, wherein performing the one or more optimization passes comprises unnesting one or more mark joins or single joins from the operator tree.

3. The method of claim 1, wherein the mark join operator is configured to create a mark column in a respective intermediate result set for the respective node, the mark column specifying, for each tuple of the respective intermediate result set, whether or not the respective left data set has a join partner from the right data set, and the mark column created for a mark join operator has a Boolean data type.

4. The method of claim 1, wherein the first clause of the plurality of clauses has a clause type selected from the group consisting of: from clause, where clause, group by clause, having clause, select clause, and order by clause.

5. The method of claim 4, wherein the database query has at most one clause of each clause type.

6. The method of claim 4, wherein forming the operator tree comprises translating the plurality of clauses in an order according to clause type, in the order: 1) from clause, 2) where clause, 3) group by clause, 4) having clause, 5) select clause, and 6) order by clause.

7. The method of claim 6, wherein forming the operator tree comprises incrementally adding operators at a top node of an interim operator tree as the clauses are processed in order.

8. The method of claim 1, wherein performing one or more optimization passes on the operator tree further includes changing an order of the plurality of join operators in the operator tree.

9. The method of claim 8, wherein the plurality of join operators includes a first mark join operator and a first inner join operator, and changing the order of the plurality of join operators in the operator tree includes performing the first mark join operator prior to the first inner join operator.

10. The method of claim 8, wherein the order of the plurality of join operators is determined according to a cost-based join enumeration method.

11. The method of claim 1, wherein performing the one or more optimization passes on the operator tree further includes at least one of:
    for each of the plurality of join operators, selecting a left variant or a right variant to implement the respective join operator according to respective sizes of left and right data sets for a respective join operation;
    translating one or more mark join operators to one or more semi join operators; and
    translating one or more outer join operators to one or more inner join operators.

12. The method of claim 1, wherein the single join operator is configured to raise an error when there is a row in the respective left data set having two or more join partners in the respective right data set, and the single join operator is configured to operate as a left outer join otherwise.

13. The method of claim 1, wherein the predetermined set of predicate subqueries comprises an EXISTS subquery, a NOT EXISTS subquery, a UNIQUE subquery, and a quantified comparison predicate.

14. A computer system having one or more computing devices, each computing device having one or more processors and memory, wherein the memory stores one or more programs configured for execution by the one or more processors, the one or more programs comprising instructions for:
    receiving a database query from a client, the database query including a plurality of clauses;
    parsing the database query to form an operator tree including a plurality of join operators, including, for a first clause of the plurality of clauses:

in accordance with a determination that the first clause includes one of a predetermined set of predicate subqueries, adding to the operator tree a respective node that specifies a mark join operator between a respective left data set and a respective right data set;

in accordance with a determination that the first clause includes a scalar subquery, adding to the operator tree a respective node that specifies a single join operator between a respective left data set and a respective right data set; and in accordance with a determination that the first clause does not include a scalar subquery and does not include any of the predetermined set of predicate subqueries, adding a respective inner join operator or a respective outer join operator to the operator tree for each join condition in the first clause;

performing one or more optimization passes on the operator tree to form an optimized execution plan; and executing the optimized execution plan to retrieve a result set from the database.

15. The computer system of claim 14, wherein the first clause of the plurality of clauses has a clause type selected from the group consisting of: from clause, where clause, group by clause, having clause, select clause, and order by clause.

16. The computer system of claim 15, wherein forming the operator tree comprises translating the plurality of clauses in an order according to clause type, in the order: 1) from clause, 2) where clause, 3) group by clause, 4) having clause, 5) select clause, and 6) order by clause.

17. The computer system of claim 14, wherein forming the operator tree comprises incrementally adding operators at a top node of an interim operator tree as the clauses are processed in order.

18. A non-transitory computer readable storage medium storing one or more programs configured for execution by a computer system having one or more processors and memory, the one or more programs comprising instructions for:

receiving a database query from a client, the database query including a plurality of clauses;

parsing the database query to form an operator tree including a plurality of join operators, including, for a first clause of the plurality of clauses:

in accordance with a determination that the first clause includes one of a predetermined set of predicate subqueries, adding to the operator tree a respective node that specifies a mark join operator between a respective left data set and a respective right data set;

in accordance with a determination that the first clause includes a scalar subquery, adding to the operator tree a respective node that specifies a single join operator between a respective left data set and a respective right data set; and in accordance with a determination that the first clause does not include a scalar subquery and does not include any of the predetermined set of predicate subqueries, adding a respective inner join operator or a respective outer join operator to the operator tree for each join condition in the first clause;

performing one or more optimization passes on the operator tree to form an optimized execution plan; and executing the optimized execution plan to retrieve a result set from the database.

19. The non-transitory computer readable storage medium of claim 18, wherein performing the one or more optimization passes further comprises:

identifying a first single join operator in the operator tree, the first single join operator joining a first column of a first left data set to a second column of a first right data set; and in accordance with a determination that the second column is a primary key for the first right data set, replacing the first single join operator with a corresponding left outer join operator between the first left data set and the second left data set.

20. The non-transitory computer readable storage medium of claim 19, wherein the mark join operator is configured to create a mark column in a respective intermediate result set for the respective node, the mark column specifying, for each tuple of the respective intermediate result set, whether or not the respective left data set has a join partner from the respective right data set, and the mark column created for a mark join operator has a Boolean data type.

* * * * *